(12) United States Patent
Wu

(10) Patent No.: US 11,984,140 B2
(45) Date of Patent: May 14, 2024

(54) MATCHING METHOD, TERMINAL AND READABLE STORAGE MEDIUM

(71) Applicant: GUANGDONG OPPO MOBILE TELECOMMUNICATIONS CORP., LTD., Guangdong (CN)

(72) Inventor: Henggang Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 242 days.

(21) Appl. No.: 17/677,981

(22) Filed: Feb. 22, 2022

(65) Prior Publication Data

US 2022/0180899 A1 Jun. 9, 2022

Related U.S. Application Data

(63) Continuation of application No. PCT/CN2020/106521, filed on Aug. 3, 2020.

(30) Foreign Application Priority Data

Sep. 6, 2019 (CN) .......................... 201910843913.2

(51) Int. Cl.
*G11B 27/031* (2006.01)
*G10L 15/22* (2006.01)
(Continued)

(52) U.S. Cl.
CPC ............ *G11B 27/031* (2013.01); *G10L 15/22* (2013.01); *G10L 15/30* (2013.01); *G10L 25/57* (2013.01); *H04N 21/4394* (2013.01)

(58) Field of Classification Search
CPC ....... G11B 27/031; G10L 15/22; G10L 15/30; G10L 25/57; G10L 15/26; H04N 21/4394;
(Continued)

(56) References Cited

U.S. PATENT DOCUMENTS 10,362,349 B1 * 7/2019 Chiarandini ......... G06V 10/761
10,733,230 B2 * 8/2020 Jo ........................... G06V 20/47
(Continued)

FOREIGN PATENT DOCUMENTS

CN     102801925    11/2012
CN     103226947    7/2013
(Continued)

OTHER PUBLICATIONS

Rybach et al., "Audio Segmentation for Speech Recognition Using Segment Features", IEEE International Conference on Acoustics, Speech, and Signal Processing, Apr. 19, 2009, pp. 4197-4200.
EPO, European Search Report for EP Application No. 20859996.9, Sep. 8, 2022.
(Continued)

*Primary Examiner* — Helen Shibru
(74) *Attorney, Agent, or Firm* — Hodgson Russ LLP

(57) ABSTRACT

A matching method, a terminal and a non-transitory computer-readable storage medium are provided. The matching method includes extracting audio clips from an integrated video clip, the integrated video clip being obtained by integrating a plurality of original video clips. The matching method further includes acquiring recognition data of the audio clips, the recognition data including subtitle data, a start time of the subtitle data and an end time of the subtitle data. The matching method further includes matching the subtitle data to the integrated video clip based on the start time and the start time of the recognition data, to obtain a recommend video.

20 Claims, 9 Drawing Sheets

(51) Int. Cl.
*G10L 15/30* (2013.01)
*G10L 25/57* (2013.01)
*H04N 21/439* (2011.01)

(58) Field of Classification Search
CPC .. H04N 5/278; H04N 21/4307; H04N 21/233; H04N 21/4884; H04N 21/8456; H04N 21/8549
USPC .......................................................... 386/285
See application file for complete search history.

(56) References Cited

U.S. PATENT DOCUMENTS

| | | | |
|---|---|---|---|
| 11,375,295 B2 * | 6/2022 | Geng | ............... H04N 21/47217 |
| 2009/0207305 A1 | 8/2009 | Fujita et al. | |
| 2010/0066903 A1 | 3/2010 | Yang | |
| 2012/0010869 A1 | 1/2012 | McCarley et al. | |
| 2013/0188923 A1 | 7/2013 | Hartley et al. | |
| 2023/0308667 A1 * | 9/2023 | Gadgil | ................... H04N 19/85 |
| 2023/0334685 A1 * | 10/2023 | Kainth | ................... G06T 3/4046 |
| 2023/0384911 A1 * | 11/2023 | Grundmann | ........ G06F 3/04886 |

FOREIGN PATENT DOCUMENTS

| | | |
|---|---|---|
| CN | 103842936 | 6/2014 |
| CN | 106126619 | 11/2016 |
| CN | 107707931 | 2/2018 |
| CN | 108289244 | 7/2018 |
| CN | 108347643 | 7/2018 |
| CN | 108924583 | 11/2018 |
| CN | 109040779 | 12/2018 |
| KR | 20130119781 | 11/2013 |
| WO | 2007130799 | 11/2007 |

OTHER PUBLICATIONS

CNIPA, First Office Action for CN Application No. 201910843913. 2, Jan. 25, 2021.
CNIPA, Notification to Grant Patent Right for Invention for CN Application No. 201910843913.2, Aug. 11, 2021.
WIPO, International Search Report and Written Opinion for PCT/CN2020/106521, Nov. 4, 2020.
EPO, Communication for EP Application No. 20859996.9, Sep. 20, 2023.

* cited by examiner

MATCHING METHOD, TERMINAL AND READABLE STORAGE MEDIUM

CROSS-REFERENCE TO RELATED APPLICATION

This application is a continuation of International Application No. PCT/CN2020/106521, filed Aug. 3, 2020, which claims priority to Chinese Patent Application No. 201910843913.2, filed Sep. 6, 2019, the entire disclosures of which are incorporated herein by reference.

TECHNICAL FIELD

This disclosure relates to the technical field of consumer electronics, and particularly to a matching method, a terminal and a non-transitory computer-readable storage medium.

BACKGROUND

At present, in order to match video subtitles, all the video clips to-be-recognized have to be uploaded to a cloud server; and then, the cloud server extracts audio signals from the video clips, performs speech recognition on these audio signals, and returns the recognition data.

SUMMARY

Embodiments of the present disclosure provide a matching method, a terminal, and a non-transitory computer-readable storage medium.

The matching method provided by the embodiments of the present disclosure includes extracting one or more audio clips from an integrated video clip, where the integrated video clip is obtained by integrating multiple original video clips, with repeating parts of the multiple original video clips merged. The method further includes acquiring recognition data of the audio clips, the recognition data including subtitle data, a start time of the subtitle data and an end time of the subtitle data. The method further includes matching the subtitle data to the integrated video clip based on the start time and the start time of the recognition data, to obtain a recommend video.

The terminal provided by the embodiments of the present disclosure includes a processor. The processor is configured to extract one or more audio clips from an integrated video clip, where the integrated video clip is obtained by integrating multiple original video clips, with repeating parts of the multiple original video clips merged. The processor is further configured to acquire recognition data of the audio clips, the recognition data including subtitle data, a start time of the subtitle data and an end time of the subtitle data. The processor is further configured to match the subtitle data to the integrated video clip based on the start time and the start time of the recognition data, to obtain a recommend video.

The non-transitory computer-readable storage medium provided by the embodiments of the present disclosure stores computer-executable instructions thereon. When being executed by one or more processors, the computer-executable instructions cause the one or more processors to execute a matching method. The matching method includes extracting one or more audio clips from an integrated video clip, where the integrated video clip is obtained by integrating multiple original video clips, with repeating parts of the multiple original video clips merged. The matching method further includes acquiring recognition data of the audio clips, the recognition data including subtitle data, a start time of the subtitle data and an end time of the subtitle data. The matching method further includes matching the subtitle data to the integrated video clip based on the start time and the start time of the recognition data, to obtain a recommend video.

Additional aspects and advantages of this disclosure will be partially given in the following description. Some of them will become obvious from the following description, or be understood through the practice of this disclosure.

BRIEF DESCRIPTION OF THE DRAWINGS

In order to more clearly illustrate the technical solutions in the embodiments of the present disclosure or the related art, drawings that need to be used in the description of the embodiments or the related art will be briefly introduced in the following. Obviously, the drawings in the following illustrate only some of the embodiments of the present disclosure. For those of ordinary skill in the art, other drawings can be obtained based on these drawings without creative work.

DETAILED DESCRIPTION OF PREFERRED EMBODIMENTS

Figure 1:
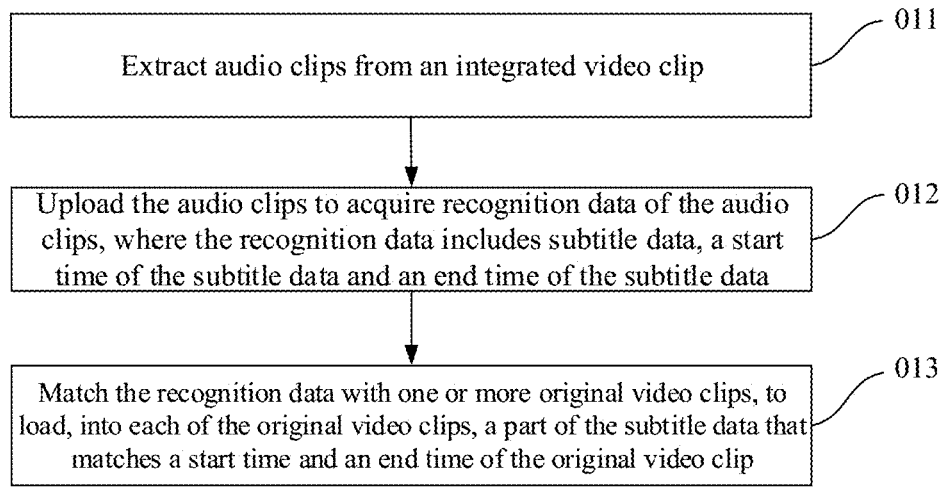
FIG. 1 is a schematic flowchart of a matching method provided by some embodiments of the present disclosure.

The embodiments of the present disclosure will be further described below in conjunction with the drawings. The same or similar reference numerals in the drawings indicate the same or similar elements or elements with the same or similar functions throughout. In addition, the implementations of the present disclosure described below in conjunction with the drawings are exemplary, and are only used to explain the embodiments of the present disclosure, and should not be construed as limiting the disclosure.

Referring to FIG. 1, the matching method provided by the embodiments of the disclosure includes:

extracting one or more audio clips from an integrated video clip, where the integrated video clip is obtained by integrating multiple original video clips, with repeating parts of the multiple original video clips merged;

uploading the audio clips to acquire recognition data of the audio clips, the recognition data including subtitle data, a start time of the subtitle data and an end time of the subtitle data; and matching the recognition data with the multiple original video clips, to load, into each of the original video clips, a part of the subtitle data that matches a start time and an end time of the original video clip.

Figure 5:
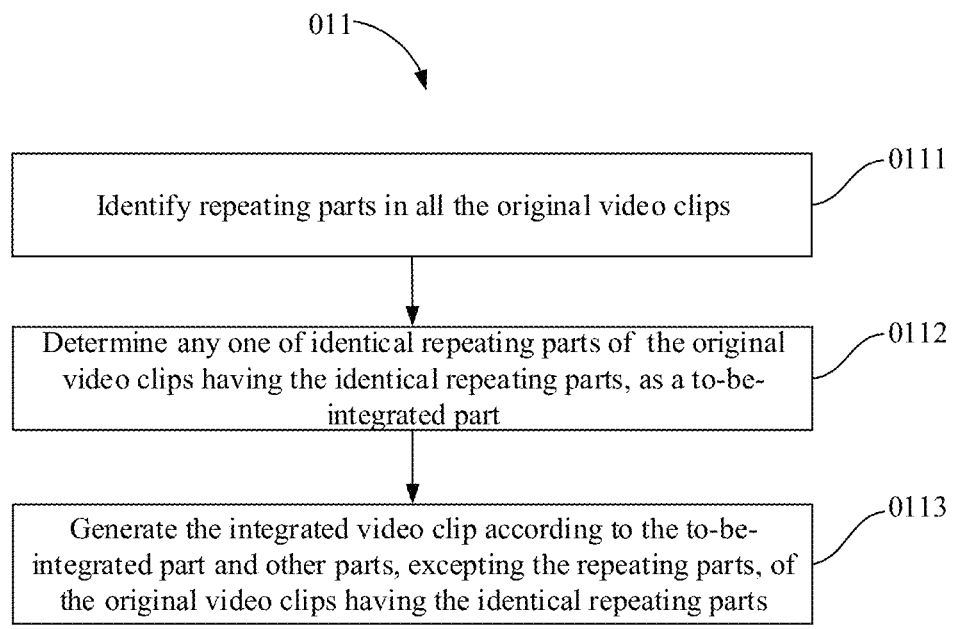
FIG. 5 is a schematic flowchart of a matching method provided by some embodiments of the present disclosure.

Referring to FIG. 5, in some embodiments, before the extracting one or more audio clips from an integrated video clip, the method further includes:

identifying the repeating parts in all the original video clips;

determining any one of identical repeating parts of all the original video clips as a to-be-integrated part until the operation of determining the to-be-integrated part is performed for all the repeating parts, to obtain at least one to-be-integrated part; and generating the integrated video clip, according to the at least one to-be-integrated part and other parts of the original video clips excepting the repeating parts.

Figure 8:
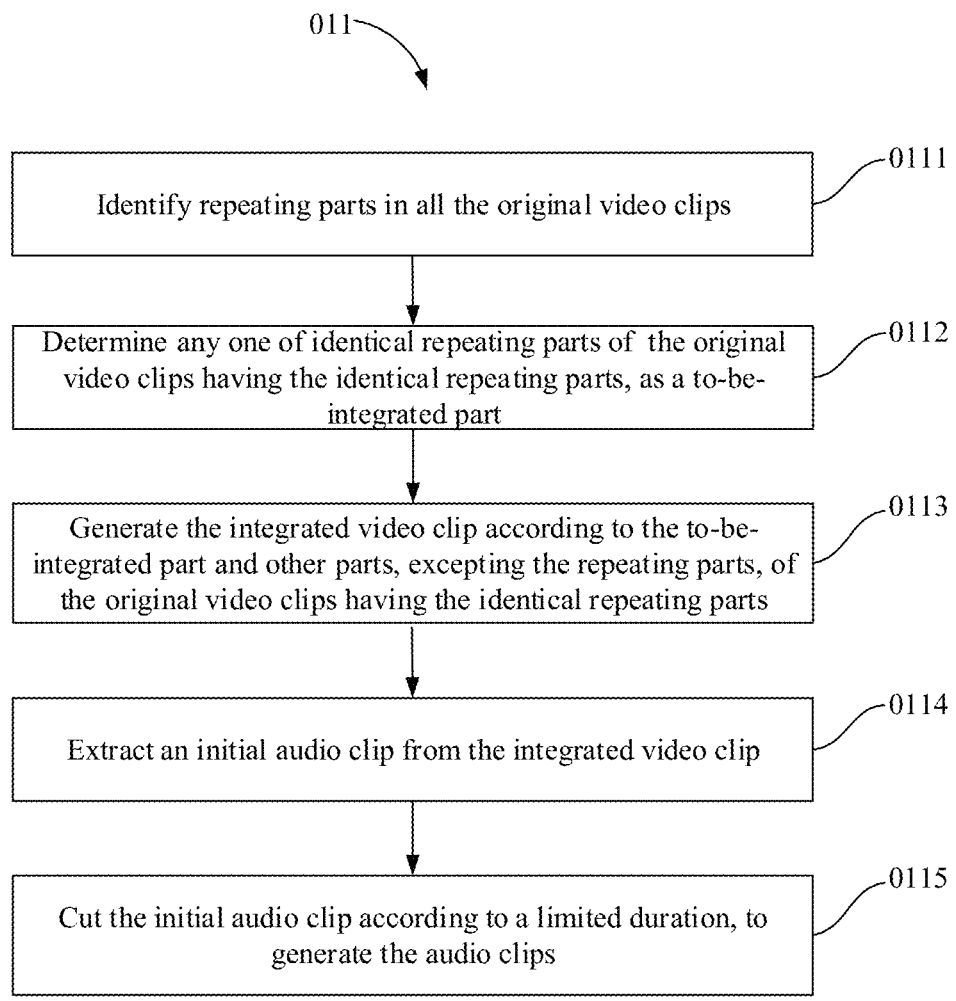
FIG. 8 is a schematic flowchart of a matching method provided by some embodiments of the present disclosure.

Referring to FIG. 8, in some embodiments, the extracting one or more audio clips from an integrated video clip further includes:

extracting an initial audio clip from the integrated video clip; and cutting the initial audio clip according to a limited duration, to generate the audio clips of the integrated video clip.

Figure 11:
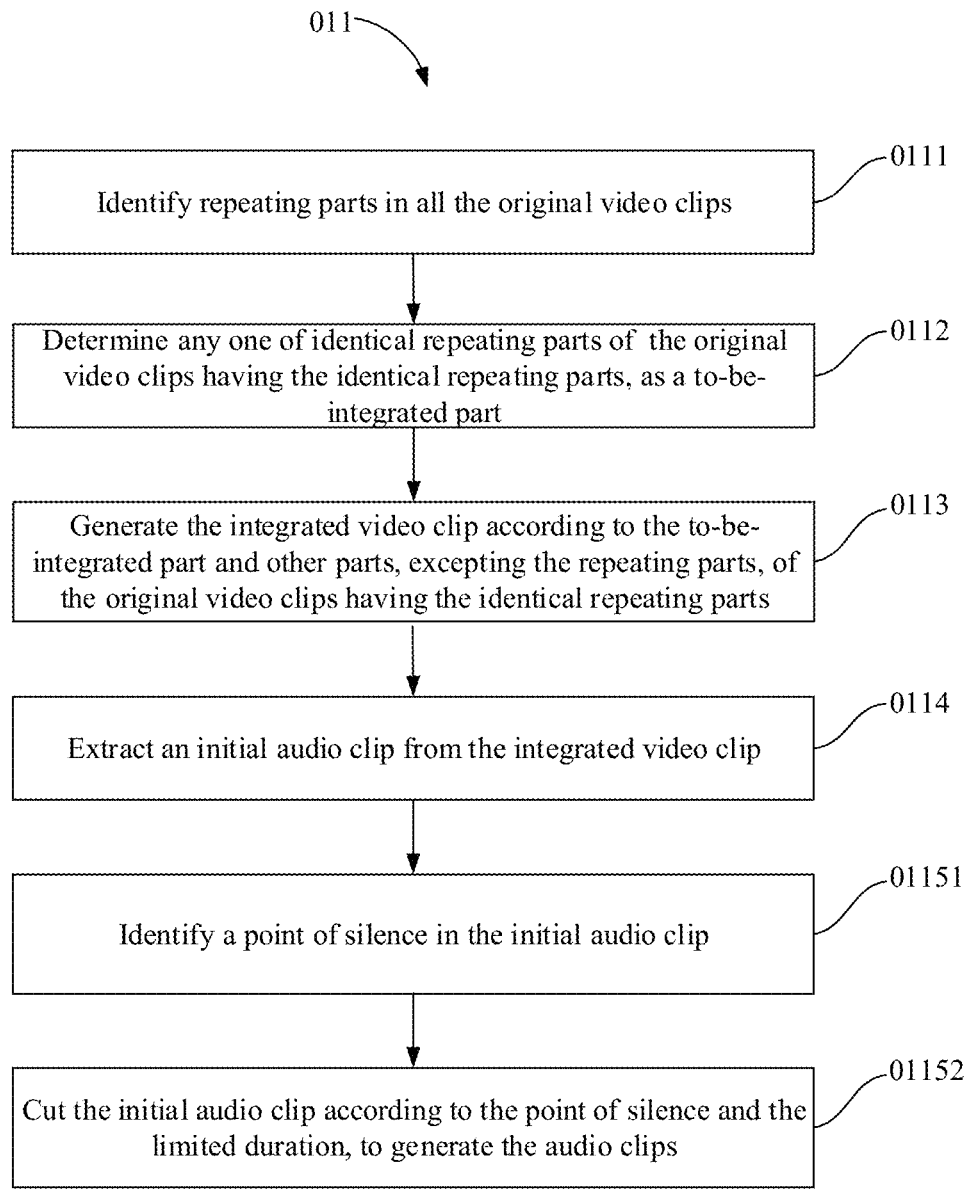
FIG. 11 is a schematic flowchart of a matching method provided by some embodiments of the present disclosure.

Referring to FIG. 11, in some embodiments, the cutting the initial audio clip according to a limited duration to generate the audio clips of the integrated video clip, includes:

identifying a point of silence in the initial audio clip; and cutting the initial audio clip according to the point of silence and the limited duration, to generate the audio clips of the integrated video clip.

Figure 14:
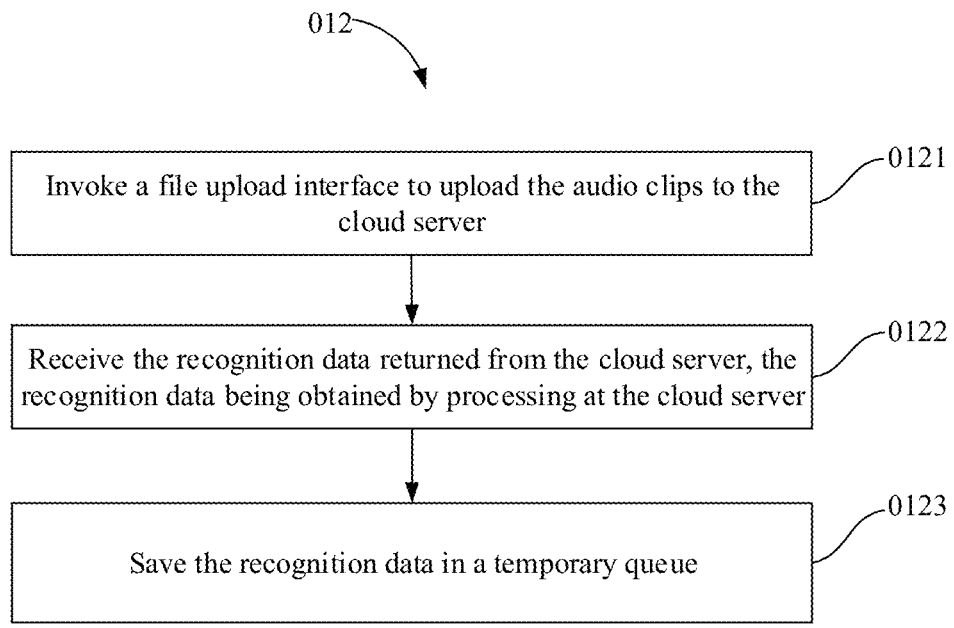
FIG. 14 is a schematic flowchart of a matching method provided by some embodiments of the present disclosure.
Figure 15:
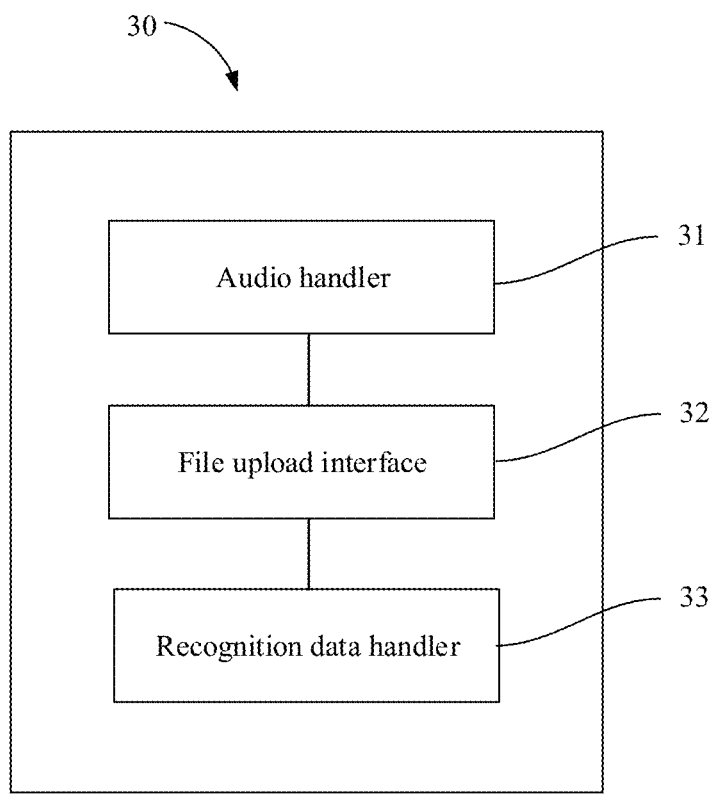
FIG. 15 is a schematic diagram illustrating the structure of a speech recognition module provided by some embodiments of the present disclosure.

Referring to FIG. 14 and FIG. 15, in some embodiments, the uploading the audio clips to acquire recognition data of the audio clips includes: invoking a file upload interface 32 to upload the audio clips to a cloud server 200; receiving the recognition data returned from the cloud server 200, the recognition data being obtained by processing at the cloud server; and saving the recognition data in a temporary queue.

In some embodiments, the identifying the repeating parts in all the original video clips includes:

acquiring source paths of all the original video clips, and acquiring the start time and the end time of each of the original video clips in a respective source video; and determining the repeating parts, according to the source paths, the start times, and the end times of the original video clips.

In some embodiments, the matching method further includes:

determining a time interval between two of the original video clips, according to source paths, the start times, and the end times of the original video clips; and integrating the two original video clips into one original video clip, upon determining that the time interval between the two original video clips is less than a predetermined strategy value.

Figure 2:
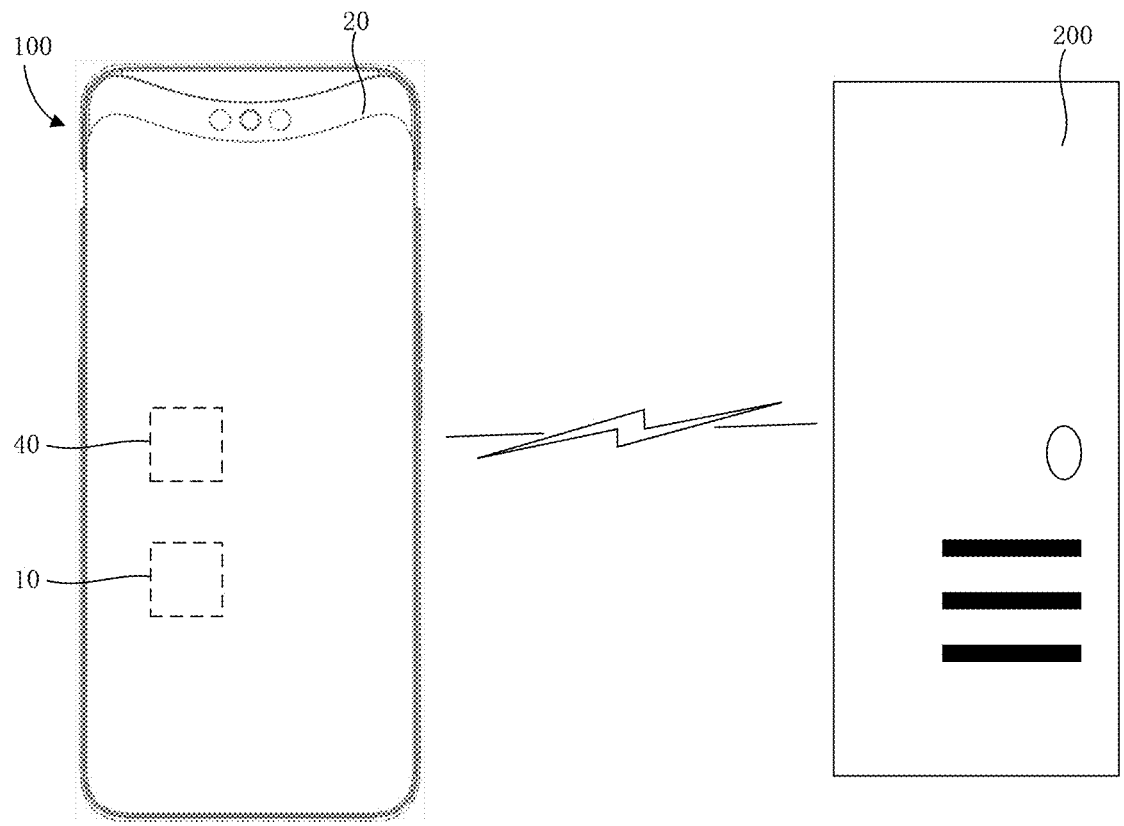
FIG. 2 is a schematic diagram illustrating the connection between a terminal and a cloud server in some embodiments of the present disclosure.

Referring to FIG. 1 and FIG. 2, the terminal 100 provided by the embodiments of the present disclosure includes a processor 10. The processor 10 is configured to extract one or more audio clips from an integrated video clip, where the integrated video clip is obtained by integrating multiple original video clips, with repeating parts of the multiple original video clips merged. The processor is further configured to upload the audio clips to acquire recognition data of the audio clips, the recognition data including subtitle data, a start time of the subtitle data and an end time of the subtitle data. The processor is further configured to match the recognition data with the multiple original video clips, to load, into each of the original video clips, a part of the subtitle data that matches a start time and an end time of the original video clip.

Referring to FIG. 2 and FIG. 5, in some embodiments, the processor 10 is configured to identify the repeating parts in all the original video clips; determine any one of identical repeating parts of all the original video clips as a to-be-integrated part until the operation of determining the to-be-integrated part is performed for all the repeating parts, to obtain at least one to-be-integrated part; and generate the integrated video clip, according to the at least one to-be-integrated part and other parts of the original video clips excepting the repeating parts.

Referring to FIG. 2 and FIG. 8, in some embodiments, the processor 10 is further configured to extract an initial audio clip from the integrated video clip; and cut the initial audio clip according to a limited duration, to generate the audio clips of the integrated video clip.

Referring to FIG. 2 and FIG. 11, in some embodiments, the processor 10 is further configured to identify a point of silence in the initial audio clip; and cut the initial audio clip according to the point of silence and the limited duration, to generate the audio clips of the integrated video clip.

Referring to FIG. 2, FIG. 14 and FIG. 15, in some embodiments, the terminal 100 further includes a memory 40, and the processor 10 is further configured to invoke a file upload interface 32 to upload the audio clips to a cloud server 200; receive the recognition data returned from the cloud server 200, the recognition data being obtained by processing at the cloud server; and save the recognition data in a temporary queue of the memory 40.

Figure 16:
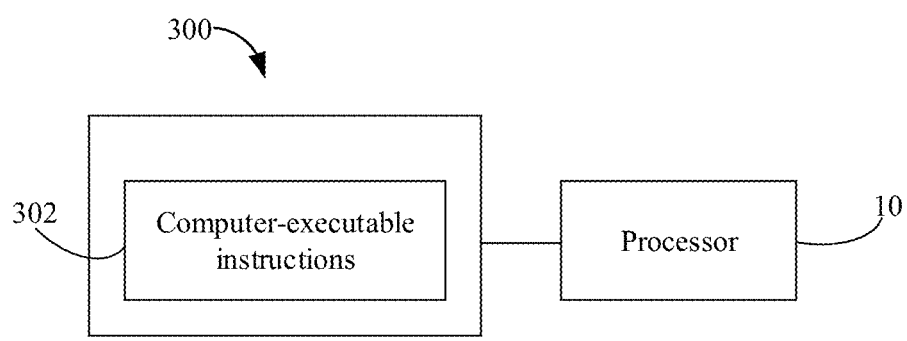
FIG. 16 is a schematic diagram illustrating the connection between a processor and a computer-readable storage medium provided by some embodiments of the present disclosure.

Referring to FIG. 1 and FIG. 16, the non-transitory computer-readable storage medium 300 provided by the embodiments of the present disclosure stores computer-executable instructions thereon. When being executed by one or more processors 10, the computer-executable instructions 302 cause the one or more processors 10 to execute a matching method including: extracting one or more audio clips from an integrated video clip, where the integrated video clip is obtained by integrating multiple original video clips, with repeating parts of the multiple original video clips merged; uploading the audio clips to acquire recognition data of the audio clips, the recognition data including subtitle data, a start time of the subtitle data and an end time of the subtitle data; and matching the recognition data with the multiple original video clips, to load, into each of the original video clips, a part of the subtitle data that matches a start time and an end time of the original video clip.

Referring to FIG. 5, in some embodiments, before the extracting one or more audio clips from an integrated video clip, the method includes:

identifying the repeating parts in all the original video clips;

determining any one of identical repeating parts of all the original video clips as a to-be-integrated part until the operation of determining the to-be-integrated part is performed for all the repeating parts, to obtain at least one to-be-integrated part; and generating the integrated video clip, according to the at least one to-be-integrated part and other parts of the original video clips excepting the repeating parts.

Referring to FIG. 8, in some embodiments, the extracting one or more audio clips from an integrated video clip further includes:

extracting an initial audio clip from the integrated video clip; and cutting the initial audio clip according to a limited duration, to generate the audio clips of the integrated video clip.

Referring to FIG. 11, in some embodiments, the cutting the initial audio clip according to a limited duration to generate the audio clips of the integrated video clip, includes:

identifying a point of silence in the initial audio clip; and cutting the initial audio clip according to the point of silence and the limited duration, to generate the audio clips of the integrated video clip.

Referring to FIG. 14 and FIG. 15, in some embodiments, the uploading the audio clips to acquire recognition data of the audio clips includes: invoking a file upload interface 32 to upload the audio clips to a cloud server 200; receiving the recognition data returned from the cloud server 200, the recognition data being obtained by processing at the cloud server; and saving the recognition data in a temporary queue.

In some embodiments, the identifying the repeating parts in all the original video clips includes:

acquiring source paths of all the original video clips, and acquiring the start time and the end time of each of the original video clips in a respective source video; and determining the repeating parts, according to the source paths, the start times, and the end times of the original video clips.

In some embodiments, the matching method further includes:

determining a time interval between two of the original video clips, according to source paths, the start times, and the end times of the original video clips; and integrating the two original video clips into one original video clip, upon determining that the time interval between the two original video clips is less than a predetermined strategy value.

Referring to FIG. 1 and FIG. 2, the matching method provided by the embodiments of the present disclosure includes the following operations.

At block 011, one or more audio clips are extracted from an integrated video clip, where the integrated video clip is obtained by integrating multiple original video clips, with repeating parts of the multiple original video clips merged.

At block 012, the audio clips are uploaded to acquire recognition data of the audio clips, where the recognition data includes subtitle data, a start time of the subtitle data and an end time of the subtitle data.

At block 013, the recognition data is matched with the multiple original video clips, to load, into each of the original video clips, a part of the subtitle data that matches a start time and an end time of the original video clip. And accordingly, the recommended video is generated according to the multiple original video clips into which the subtitle data has been loaded. In other words, the subtitle data is matched to the integrated video clip based on the start time and the start time of the recognition data, to obtain the recommend video.

In some embodiments, the terminal 100 further includes a processor 10. The processor 10 is configured to: extract one or more audio clips from an integrated video clip, where the integrated video clip is obtained by integrating multiple original video clips, with repeating parts of the multiple original video clips merged; upload the audio clips to acquire recognition data of the audio clips, the recognition data including subtitle data, a start time of the subtitle data and an end time of the subtitle data; and match the recognition data with the multiple original video clips, to load, into each of the original video clips, a part of the subtitle data that matches a start time and an end time of the original video clip. In other words, operations 011, 012 and 013 may be implemented by the processor 10.

Specifically, the terminal 100 includes a housing 20 and the processor 10. The processor 10 is installed in the housing. Specifically, the terminal 100 may be a mobile phone, a tablet computer, a display, a notebook computer, a teller machine, a gate, a smart watch, a head-mounted display device, a game console, and the like. The embodiments of this disclosure are described by taking a case where the terminal 100 is a mobile phone as an example. It can be understood that the specific form of the terminal 100 is not limited to a mobile phone. The housing 20 can also be used to install functional modules such as an imaging device, a power supply device, and a communication device of the terminal 100, so that the housing 20 provides protections, such as dust prevention, shatter-resistant protection and water resistance, for the functional modules.

When a user uses the mobile phone to capture videos in daily life, the processor 10 automatically classifies the captured videos. The captured video may be an instant video. For example, a video is temporarily captured in a chat application and sent to another party, where such video does not need to be saved to a system album. Alternatively, the captured video may also be a saved video, such as a video captured by the user with the system camera, or a video downloaded by the user manually from the network and saved to the system album. For example, the processor 10 classifies the captured videos into multiple categories, such as selfies, landscapes, pets, cute babies, and parties. Among them, the captured video of the selfie type is defined as a video in which a ratio of the number of frames of the selfie images in the captured video to the total number of frames of the entire captured video is greater than a first predetermined ratio (for example, the first predetermined ratio is greater than ½), where the selfie image is an image in which a ratio of the human face image part to the current image is greater than a second predetermined ratio (for example, the second predetermined ratio is ½). The captured video of the landscape type is defined as a video in which a ratio of the number of frames of the landscape images in the captured video to the total number of frames of the entire captured video is greater than a third predetermined ratio (for example, the third predetermined ratio is greater than ⅔), where the landscape images are images that do not include images of people. The captured video of the pet type is defined as a video in which a ratio of the number of frames of the pet images in the captured video to the total number of frames of the entire captured video is greater than a fourth predetermined ratio (for example, the fourth predetermined ratio is greater than ⅔), where the pet image is an image in which a ratio of the pet image part to the current image is greater than a fifth ratio (for example, the fifth predetermined ratio is greater than ⅓). The captured video of the party type is defined as a video in which a ratio of the number of frames of the party images in the captured video to the total number of frames of the entire captured video is greater than a sixth predetermined ratio (for example, the sixth predetermined ratio is greater than ¾), where the party image is an image containing multiple people. In this way, the type of the captured video can be quickly determined through image recognition. It should be noted that the above-mentioned values of the first predetermined ratio to the sixth predetermined ratio are only exemplary, and should not be regarded as limiting the present disclosure.

After the type of the captured video is determined, the terminal 100 associates multiple captured videos of the same type to form a temporary recommended video and recommend it to the user. The recommended video can be formed by one or more video clips selected from multiple captured videos.

The one or more video clips can be selected from a same one captured video (for example, 3 video clips selected from a same captured video). Alternatively, the multiple video clips can be selected from multiple captured videos (for example, 1, 2, and 3 video clips selected from 3 captured videos, respectively). If the user is satisfied with the temporary recommended video, he/she can manually save it; and if the user is not satisfied with the temporary recommended video, or if the user does not make an operation on the temporary recommended video within a certain period of time, the recommended video is deleted.

In order to increase the expressiveness and impact of the recommended video, the terminal 100 may add a piece of music to the recommended video, and edit the individual video clips of the recommended video according to the music. For example, it is switched to a next video clip at a rhythmical point of the music, and the un-played part of the previous video clip is cut out, so that the video playback matches the rhythm points of the music, thereby improving the expressiveness and impact of the recommended video.

The recommended video is formed by combining multiple video clips. The multiple video clips, when being selected from a same source video, may have repeating parts. Multiple identical repeating parts will be recognized multiple times during the speech recognition after being uploaded to the cloud server 200, resulting in a waste of the speech recognition resources. Therefore, the processor 10 may integrate the video clips with identical repeating parts, in such a manner that only one of the identical repeating parts is remained in the integrated video clip.

The terminal 100 can also add subtitles to the recommended video to increase the readability of the recommended video. The terminal 100 may extract the audio clips from the integrated video clip, and then upload only such audio clips to the cloud server 200 providing speech recognition services (such as a server of a third-party speech recognition service provider). Then, the cloud server 200 performs speech recognition on the audio clips, and returns the recognition data to the terminal 100, where the recognition data includes the subtitle data, the start time of the subtitle data and the end time of the subtitle data. Compared with a case where the cloud server needs to recognize the audio signals from the video clips and then recognize the audio signals to obtain the recognition data, which correspondingly has a slow recognition speed and consumes more traffic, in the embodiments of the disclosure, the processing pressure of the cloud server 200 can be reduced and the traffic can be saved, since the terminal 100 can extract the audio clips from the video clips in advance and the cloud server 200 only needs to recognize the audio clips.

Since the recommended video is played by playing the individual original video clips thereof, after acquiring the recognition data, the processor 10 needs to match the recognition data with one or more original video clips. In which, there is one-to-one correspondence among the recognition data, the audio clips, and the integrated video clip from which the audio clips are extracted, and there is correspondence between the integrated video clip and the one or more original video clips. Therefore, it is only needed to match the recognition data with the one or more original video clips. More specifically, the start time and end time of the subtitle data in the recognition data are matched with each of the original video clips. The start time and end time of the subtitle data (which are referred to as a first start time and a first end time hereinafter) refer to respectively a start time and an end time of a duration of the audio clip corresponding to the subtitle data in the respective source video. The start time and end time of each original video clip (which are referred to as a second start time and a second end time hereinafter) also refer to respectively a start time and an end time of a duration of the original video clip in the respective source video. The processor 10 may load a part of the subtitle data, which corresponds to the second start time and the second end time of each original video clip, into the original video clip, so as to achieve the matching of the subtitles.

Figure 3:
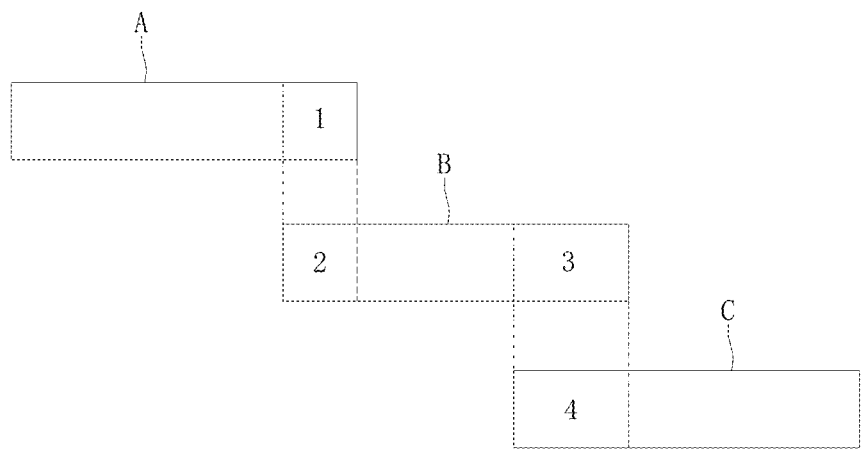
FIG. 3 and FIG. 4 are schematic diagrams illustrating the principle of the matching method provided by some embodiments of the present disclosure.
Figure 4:
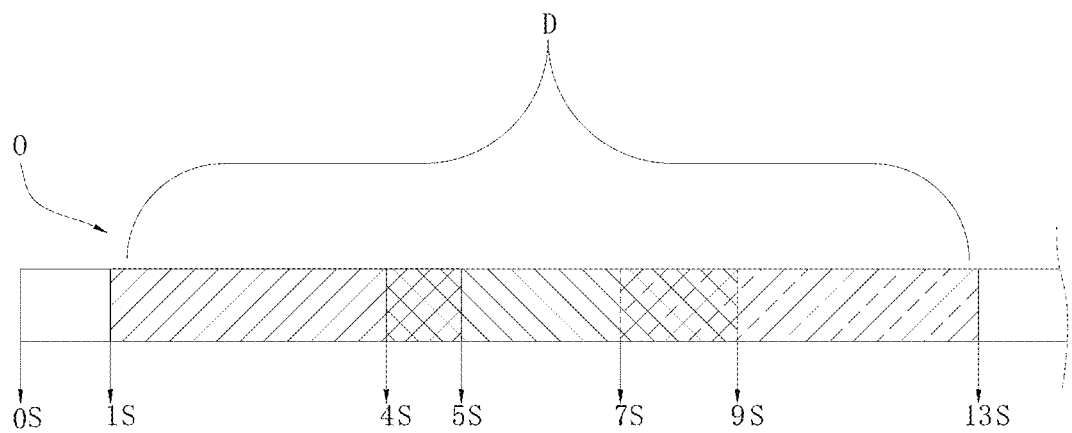

For example, as shown in FIG. 3, a video clip A (selected from the source video O shown in FIG. 4, which is a part from the first second (S) to the fifth second), a video clip B (selected from the source video O, which is a part from the fourth second to the ninth second), and a video clip C (selected from source video O, which is a part from the seventh second to the thirteenth second) selected by the terminal 100 are all part of the source video O. Part "1" of the video clip A and part "2" of the video clip B both are a video clip from the fourth second to the fifth second in source video O, which are repeating parts. Part "3" of the video clip B and part "4" of the video clip C both are a video clip from the seventh second to the ninth second in the source video O, which are also repeating parts. Therefore, the video clips A, B and C are integrated to remove redundant repeating parts, i.e., merging the repeating parts, so as to obtain the integrated video clip D shown in FIG. 4. That is, the video clip D is the part from the first second to the thirteenth second in the source video O. The audio clip corresponding to the video clip D is also an audio clip corresponding to the part from the first second to the thirteenth second in the source video. Therefore, the first start time of the subtitle data of the audio clip corresponding to the video clip D is the first second, and the first end time thereof is the thirteenth second. The video clip A is selected as the part from the first second to the fifth second of the source video O, accordingly, the second start time and second end time of the video clip A are the first second and the fifth second, respectively. The video clip B is selected as the part from the fourth second to the ninth second of the source video O, accordingly, the second start time and the second end time of the video clip B are the fourth second and the ninth second, respectively.

The video clip C is selected as the part from the seventh second to the thirteenth second of the source video O, accordingly, the second start time and the second end time of the video clip C are the seventh second and the thirteenth second, respectively. Therefore, the processor 10 only needs to load the part from the first second to the fifth second of the subtitle data to the video clip A, load the part from the fourth second and the ninth second of the subtitle data to the video clip B, and load the part from the seventh second to the thirteenth second of the subtitle data to the video clip C. In this way, the whole subtitles can be accurately matched.

Referring to FIG. 2 and FIG. 5, in some embodiments, the operation 011 includes the following operations.

At block 0111, the repeating parts in all the original video clips are identified.

At block 0112, any one of identical repeating parts of the original video clips having the identical repeating parts, is determined as a to-be-integrated part. In other words, any one of identical repeating parts of all the original video clips is determined as a to-be-integrated part until the operation of determining the to-be-integrated part is performed for all the repeating parts, to obtain at least one to-be-integrated part.

At block 0113, the integrated video clip is generated according to the to-be-integrated part and other parts, excepting the identical repeating parts, of the original video clips having the identical repeating parts. In other words, the integrated video clip is generated by integrating the at least one to-be-integrated part and other parts of the original video clips excepting the repeating parts.

In some embodiments, the processor 10 is configured to: identify the repeating parts in all the original video clips; determine any one of identical repeating parts of all the original video clips as a to-be-integrated part until the operation of determining the to-be-integrated part is performed for all the repeating parts, to obtain at least one to-be-integrated part; and generate the integrated video clip, by integrating the at least one to-be-integrated part and other parts of the original video clips excepting the repeating parts. In other words, the operations 0111, 0112, and 0113 may be implemented by the processor 10.

Figure 6:
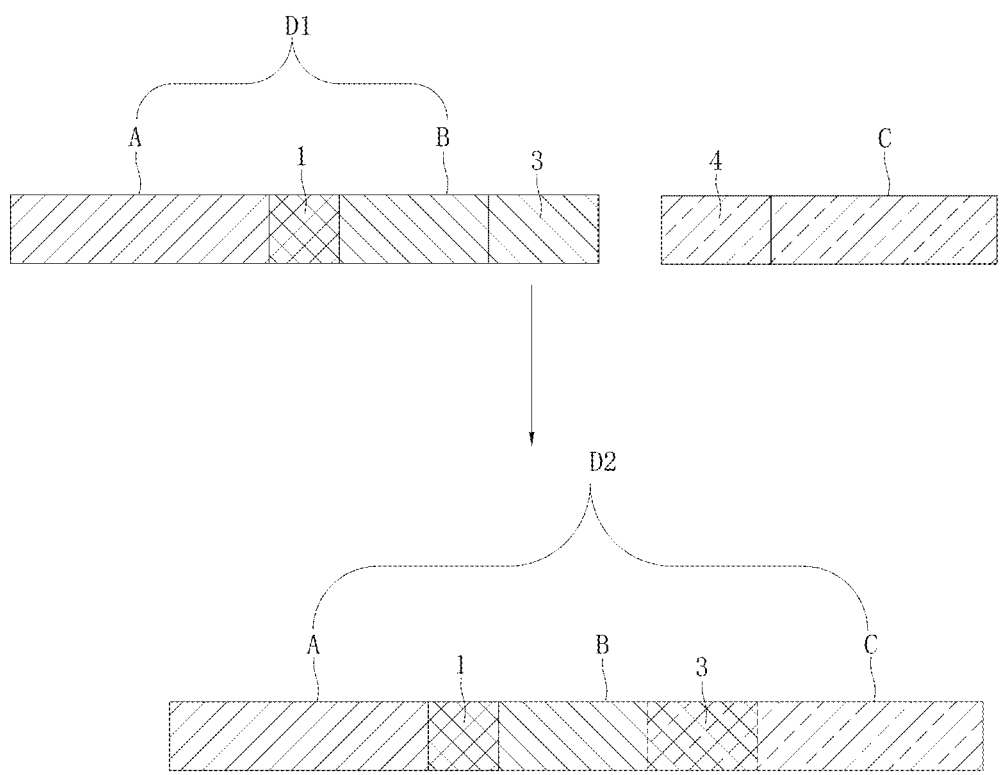
FIG. 6 and FIG. 7 are schematic diagrams illustrating the principle of the matching method provided by some embodiments of the present disclosure.

Specifically, referring to FIG. 3 and FIG. 4, in this disclosure, before the speech recognition is performed, the processor 10 identifies whether there are repeating parts in the multiple original video clips. Since the captured contents of different source videos O generally are quite different, there is a small probability that the selected video clips have repeating parts. Therefore, the processor 10 does not need to compare the video clips with different source paths (that is, video clips selected from different source videos O) for determining the repeating parts, and only needs to compare the multiple video clips with the same source path (that is, multiple video clips selected from the same source video O) to determine whether the multiple video clips have repeating parts. When the multiple video clips selected from the same source video O have repeating parts, any one of the identical repeating parts of the multiple video clips may be directly determined as the to-be-integrated part (for example, part "1" in FIG. 3 is used as the to-be-integrated part of the video clip A and the video clip B, and part "3" is used as the to-be-integrated part of the video clip B and the video clip C). The to-be-integrated part (such as part "1" in FIG. 3) and the other parts, excepting the identical repeating parts such as part "1" and part "2", of the video clips having the identical repeating parts (such as the video clip A and video clip B in FIG. 3) are spliced together to form a video clip D1 shown in FIG. 6. The video clip D1 includes the video clip B, that is, the video clip D1 and the video clip C have identical repeating parts (which are part "3" and part "4"). The to-be-integrated part (such as part "3") and the other parts, excepting the identical repeating parts such as part "3" and part "4", of the video clips having the identical repeating parts (such as the video clip D1 and video clip C) are spliced together to form a video clip D2. In this way, the video clips having the identical repeating parts are integrated into one video clip. When the speech recognition needs to be performed, the processor 10 only needs to upload the integrated video clip to the cloud server 200 (shown in FIG. 2) for speech recognition. As such, the identical repeating parts only need to be uploaded and recognized once, the recognition speed is relatively fast and the traffic consumption is low. The integrated video clip does not have multiple identical repeating parts to-be-recognized, and the voice recognition needs to be performed on all parts of the integrated video clip, which makes the speech recognition resources of the cloud server 200 fully utilized. In addition, compared with the case where the cloud server 200 is requested once for each of the video clips having the identical repeating parts and thus the cloud server 200 has to be requested multiple times, in the embodiments, the cloud server is requested only once for the multiple video clips having the identical repeating parts and thus the resources of the cloud server 200 can be saved, since the multiple video clips having the identical repeating parts are integrated into one video clip.

Referring to FIG. 2, in some embodiments, the processor 10 is further configured to acquire source paths of all the original video clips, and acquire the start time and the end time of each of the original video clips in a respective source video; and determine the repeating parts, according to the source paths, the start times, and the end times of the original video clips.

Specifically, when the processor 10 compares the multiple original video clips to determine whether they have identical repeating parts, the processor may first acquire the source paths of the video clips from which the source videos corresponding to the individual video clips can be found. When the source paths of the multiple video clips are the same, this means that the multiple video clips are selected from a same source video. As mentioned above, video clips selected from different source videos generally do not have repeating parts. Therefore, in some embodiments, the processor 10 only compares multiple video clips selected from a same source video to identify the repeating parts. It can be understood that, when selecting the video clips, the processor 10 can obtain the start time and end time of each video clip in the source video. After the processor 10 obtains the start time and end time of each video clip in the source video, the processor can determine whether two video clips overlap based on the start times and end times thereof. If the durations, obtained from the respective start times and end times, of the two video clips overlap, this means that the two video clips have repeating parts. For example, in FIG. 3, the video clip A is selected as the part from the first second (S) to the fifth second of the source video O of FIG. 4 (that is, the start time is the first second, and the end time is the fifth second); the video clip B is selected as the part from the fourth second to the ninth second of the source video O (that is, the start time is the fourth second, and the end time is the ninth second); and the video clip C is selected as the part from the seventh second to the thirteenth second of the source video O (that is, the start time is the seventh second and the end time is the thirteenth second). Part "1" of the video clip A and part "2" of the video clip B overlap, where both of them are a video clip from the fourth second to the fifth second in the source video O, and thus are repeating parts. Part "3" of the video clip B and part "4" of the video clip C overlap, where both of them are a video clip from the seventh second to the ninth second in the source video O, and thus are also repeating parts. In this way, there is no need to perform image recognition to compare the video contents of the individual video clips, and the repeating parts can be quickly determined.

Referring to FIG. 2, in some embodiments, the processor 10 is further configured to: determine a time interval between two original video clips, according to source paths, the start times, and the end times of the original video clips; and integrate the two original video clips into one original video clip, upon determining that the time interval between the two original video clips is less than a predetermined strategy value.

Figure 7:
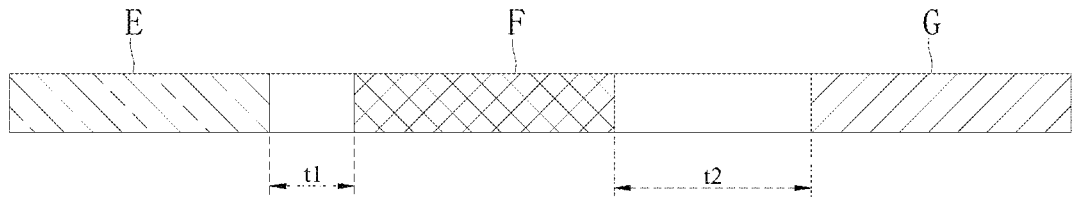

Specifically, when the multiple video clips are selected from the same source video, they may have no overlapping parts. However, during the selection, the time interval between two adjacent video clips may be too short (that is, the time interval between the end time of the previous video clip and the start time of the next video clip is relatively small). For example, the time interval between the end time of the video clip E and the start time of the video clip F shown in FIG. 7 is t1, and t1 is less than the predetermined strategy value (the predetermined strategy value for example may be 2 S, 5 S and 10 S); therefore, the video content of the video clip E and the video content of the video clip F can be substantially regarded as being continuous. In this case, in order to reduce the number of the uploading operations for speech recognition so as to improve the speech recognition efficiency of the cloud server 200, two adjacent video clips having a short time interval therebetween can be integrated into one video clip. If the time interval between two adjacent video clips is large (for example, the time interval t2 between the video clip F and the video clip G shown in FIG. 7 is greater than the predetermined strategy value), this means that the continuity of the video contents of the two video clips is poor, and thus no integration is performed therefor.

Referring to FIG. 2 and FIG. 8, the operation 011 further includes the following operations.

At block 0114, an initial audio clip is extracted from the integrated video clip.

At block 0115, the initial audio clip is cut according to a limited duration, to generate the audio clips of the integrated video clip.

In some embodiments, the processor 10 is further configured to: extract the initial audio clip from the integrated video clip; and cut the initial audio clip according to the limited duration, to generate the audio clips of the integrated video clip. In other words, the operations 0114 and 0115 may be implemented by the processor 10.

Figure 9:
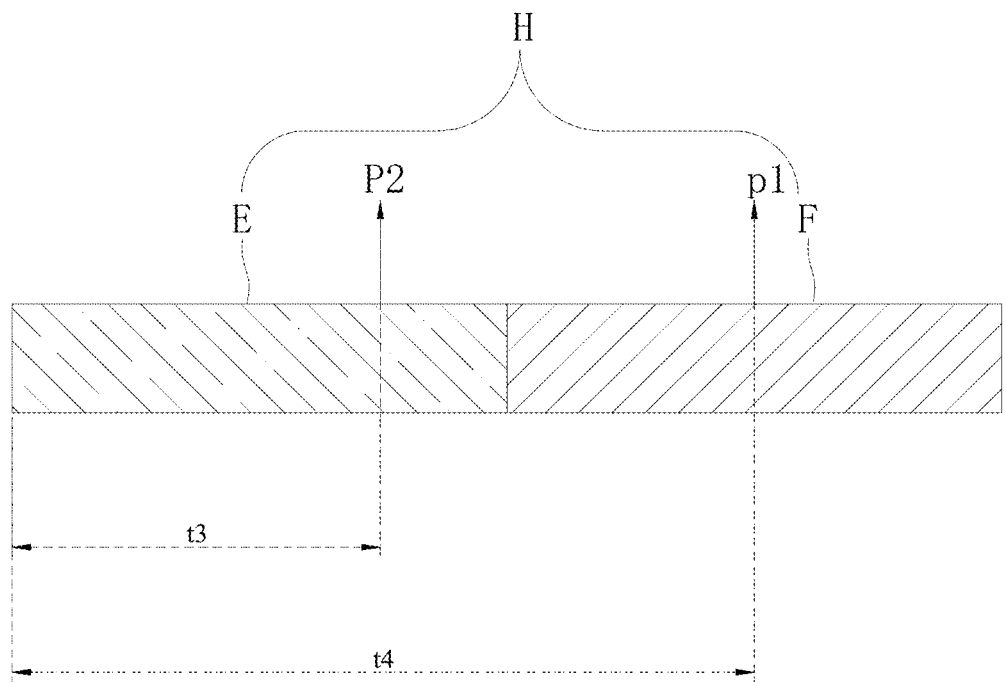
FIG. 9 and FIG. 10 are schematic diagrams illustrating the principle of the matching method provided by some embodiments of the present disclosure.
Figure 10:
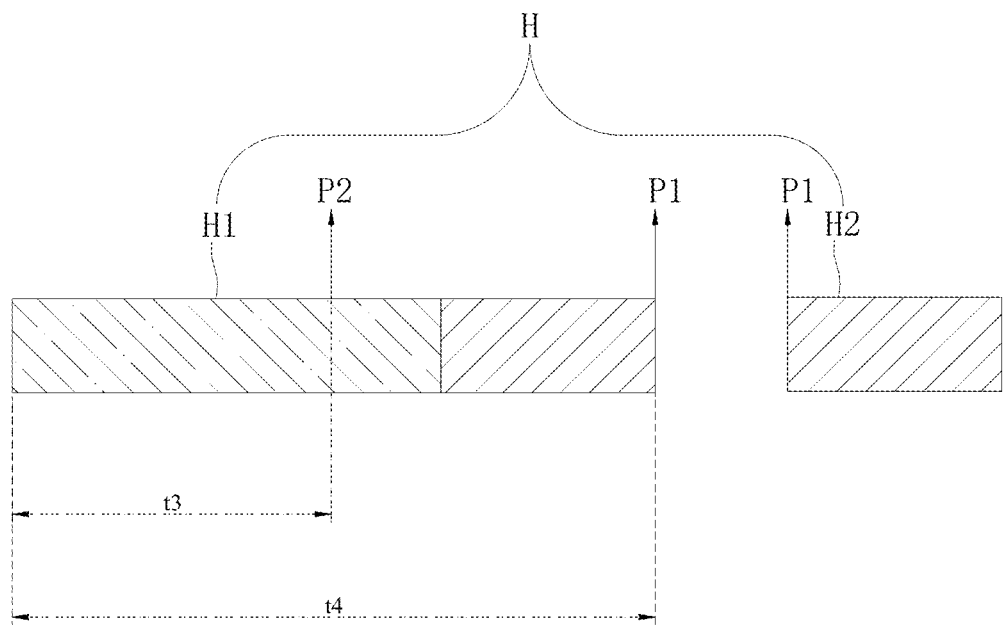

Specifically, the processor 10 extracts the initial audio clip from the integrated video clip. Thereafter, since the cloud server 200 providing speech recognition services (such as the server of a third-party speech recognition service provider) generally has restrictions on the format and size of the uploaded audio, that is, there are requirements including restricted formats, limited durations and the like, therefore, after obtaining the restricted format and limited duration of the cloud server 200, the processor 10 first converts the format of the initial audio clip into a format meeting the requirements, and then cuts the initial audio clip according to the limited duration, so that the audio clips obtained after the cutting have a size meeting the requirements. The limited duration may be a fixed value, and the size of the audio clip obtained after the cutting needs be less than or equal to the limited duration. The limited duration can also be set as a range, and the size of the audio clip obtained after the cutting needs to be within the corresponding range of the limited duration. For example, as shown in FIG. 9, the restricted format of the cloud server 200 is MP3 format, and the range of the limited duration is [t3, t4], that is, the size of the audio clip obtained after the cutting needs to be between the minimum duration t3 and the maximum duration t4, where the position corresponding to the maximum duration t4 is P1, and the position corresponding to the minimum duration t3 is P2. The processor 10 first converts the initial audio clip into the MP3 format, and then cuts the initial audio clip according to the limited duration. As shown in FIG. 10, the processor 10 performs a cutting operation for the portion of each initial audio clip that exceeds the maximum duration t4 to obtain multiple audio clips. The processor 10 cuts in the initial audio clip H at the position P1 corresponding to the maximum duration t4, to obtain the audio clip H1 and the audio clip H2. Finally, the audio clips obtained after the cutting (i.e., the audio clip H1 and the audio clip H2) are uploaded to the cloud server 200 for speech recognition.

Referring to FIG. 2 and FIG. 11, in some embodiments, the operation 0115 includes the following operations.

At block 01151, a point of silence in the initial audio clip is identified.

At block 01152, the initial audio clip is cut according to the point of silence and the limited duration, to generate the audio clips of the integrated video clip.

In some embodiments, the processor 10 is further configured to: identify the point of silence in the initial audio clip; and cut the initial audio clip according to the point of silence and the limited duration, to generate the audio clips of the integrated video clip. In other words, the operations 01151 and 01152 may be implemented by the processor 10.

Figure 12:
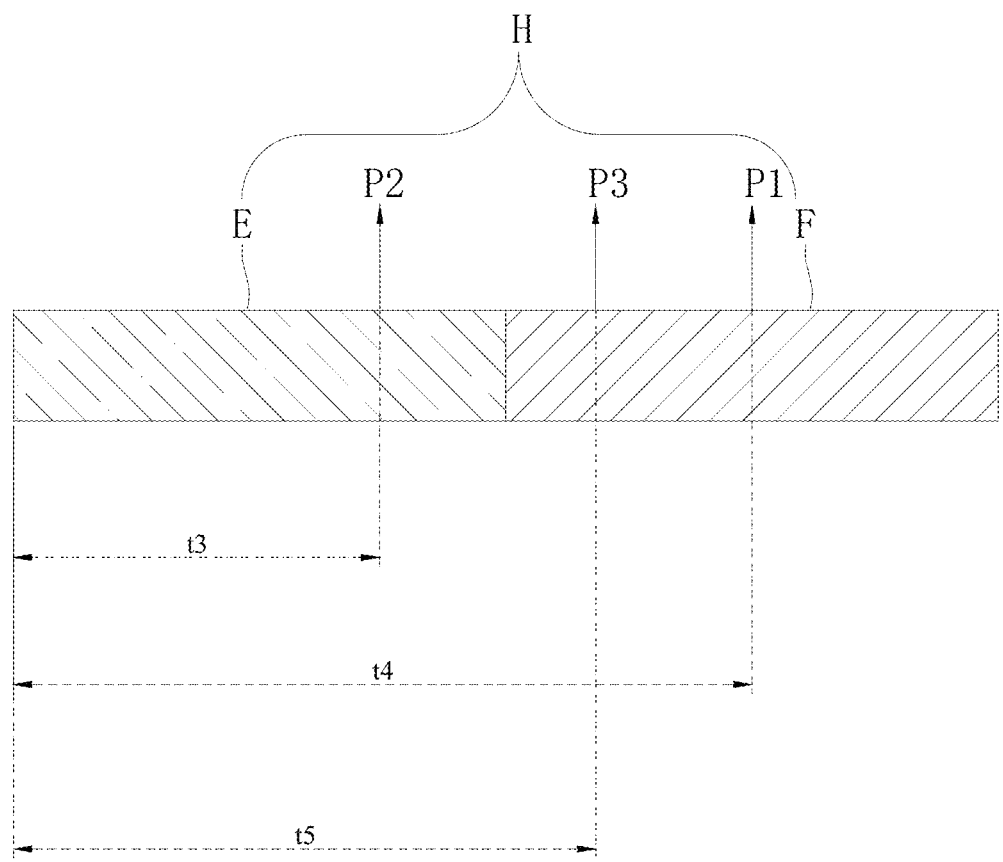
FIG. 12 and FIG. 13 are schematic diagrams illustrating the principle of the matching method provided by some embodiments of the present disclosure.
Figure 13:
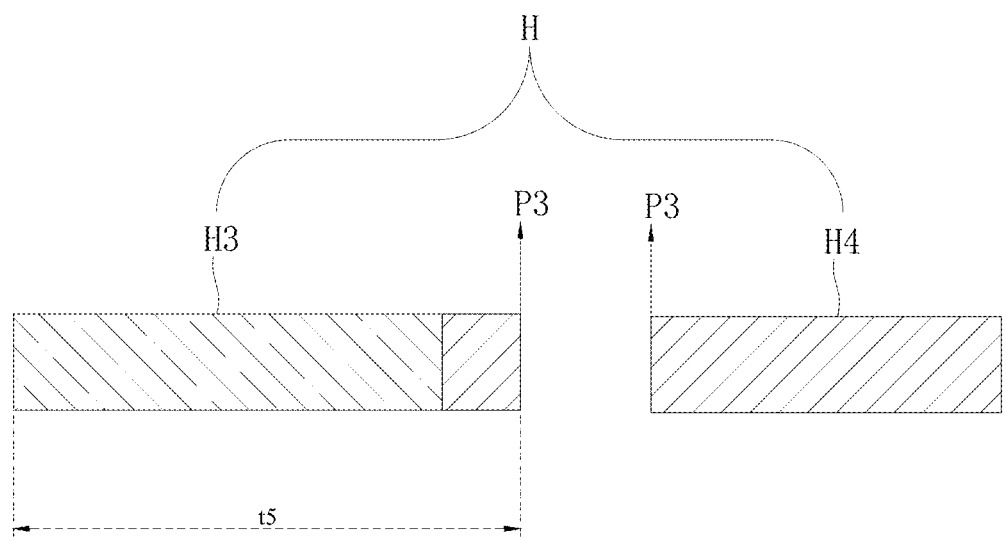

Specifically, it can be understood that, when the initial audio clip is cut in the above embodiments, if the initial audio clip is clipped only according to the limited duration, it may cause a complete sentence in the initial audio clip to be divided into two different audio clips through the cutting. When the cloud server 200 recognizes incomplete sentences, there is a greater chance of recognition errors. In order to prevent a complete sentence from being divided into two different audio clips, the processor 10 may first identify the point of silence of the initial audio clip. The point of silence refers to an initial point starting from which no voice made by someone exists in the audio clip for a preset period of time. It can be understood that, when the point of silence is recognized, this means that one sentence spoken by a person has finished in the audio. In this case, if the processor 10 cuts at the point of silence, a complete sentence cannot be divided into two different audio clips. As shown in FIG. 12 and FIG. 13, the point of silence of the initial audio clip H is a position P3 corresponding to the duration of t5 which meets the limited duration. After cutting at the point of silence P3, the audio clip H3 and the audio clip H4 can be obtained. A complete sentence in the initial audio clip H would not divided into two audio clips H3 and H4. In this way, the complete sentence can be prevented from being divided into two different audio clips, thereby reducing the recognition error rate of the cloud server 200 and improving the recognition accuracy.

Referring to FIG. 2, in some embodiments, the processor 10 is further configured to determine, as the point of silence, an initial point starting from which an intensity of an audio signal of the audio clip is less than a predetermined intensity value for a preset period of time, i.e., an initial point of a preset period of time during which an intensity of an audio signal of the initial audio clip is less than a predetermined intensity value.

Specifically, when determining whether there is a voice made by someone in the audio clip, the processor 10 can detect the intensity of the audio signal corresponding to the audio clip. It can be understood that, when voice information is recorded, if someone makes a voice, the intensity of the audio signal is larger than that corresponding to only the background noise. Therefore, the processor 10 can determine whether there is a voice made by someone by determining whether the strength of the audio signal is greater than a predetermined value (for example, the predetermined value in decibels is 90 decibels). Of course, in order to ensure the accuracy of the determined point of silence, and prevent a pause position in a complete sentence (for example, which is caused by hesitation, stuttering or breathing) from being determined as the point of silence which would otherwise causes the complete sentence to be divided into different audio clips, the processor 10 may determine whether the strength of the audio signal within the preset period of time starting from the initial point (for example, the preset period of time is 2 S) is less than the predetermined value. If the strength of the audio signal within the preset period of time is less than the predetermined value, this means that no one speaks within 2 S, and the user has finished speaking one sentence. As thus, the erroneous determination of the point of silence can be prevented, and the accuracy of the determined point of silence can be improved.

Referring to FIG. 2, FIG. 14 and FIG. 15, in some embodiments, the operation 012 includes the following operations.

At block 0121, a file upload interface 32 is invoked to upload the audio clips to the cloud server 200.

At block 0122, the recognition data returned from the cloud server 200 is received, the recognition data being obtained by processing at the cloud server.

At block 0123, the recognition data is saved in a temporary queue.

In some embodiments, the terminal 100 further includes a memory 40, and the processor 10 is further configured to: invoke the file upload interface 32 to upload the audio clips to the cloud server 200; receive the recognition data returned from the cloud server 200, the recognition data being obtained by processing at the cloud server; and save the recognition data in the temporary queue of the memory 40. In other words, the operations 0121, 0122, and 0123 may be implemented by the processor 10.

Specifically, different speech recognition service providers have different requirements on the files uploaded for speech recognition. For example, the requirements on the format and size of the uploaded audio clip are different. Therefore, the terminal 100 in the embodiments of the present disclosure provides different speech recognition modules 30 for different requirements of the individual speech recognition service providers. For example, when the speech recognition service provided by a service provider C1 is used, a speech recognition module C1 is invoked; when the speech recognition service provided by a service provider C2 is used, a speech recognition module C2 is invoked, and when the speech recognition service provided by a service provider C3 is used, a speech recognition module C3 is invoked, and so on. The speech recognition module C1, the speech recognition module C2, and the speech recognition module C3 are compiled according to the requirements of the service provider C1, the service provider C2, and the service provider C3, respectively, so that the formats and sizes of the uploaded audio clips meet the requirements of the corresponding speech recognition service providers, thus enabling the speech recognition to be performed accurately.

The speech recognition module 30 includes an audio handler 31, a file upload interface 32, and a recognition data handler 33. When uploading the audio clips, the audio handler 31 is first invoked to process the integrated video clip to obtain the audio clips meeting the requirements of the corresponding service provider. For the specific processing process, please refer to the processing of the audio clips in the foregoing embodiments. Then, the file upload interface 32 is invoked to upload the audio clips to the server of the corresponding speech recognition service provider (i.e., the cloud server 200). Then, the cloud server 200 performs speech recognition on the audio clips to obtain the recognition data, and returns the recognition data to the terminal 100. After receiving the returned recognition data, the terminal 100 temporarily stores the recognition data in a temporary queue of the memory 40. Then, the processor 10 determines whether there are still any audio clips that need to be recognized, and if there are audio clips that need to be recognized, the above process is repeated until all the audio clips are recognized Finally, the recognition data of all the audio clips is stored in the temporary queue. The processor 10 may invoke the recognition data handler 33 to process the recognition data in the temporary queue, so that the recognition data is converted into data capable of being processed by the terminal 100. For example, the format of the subtitle data returned from the cloud server 200 is format A, and the format of the subtitle data required by the terminal 100 is format B. In this case, the processor 10 needs to invoke the recognition data handler 33 to convert the format of the subtitle data from format A to format B, so that the terminal 100 can process the subtitle data normally. In this way, the terminal 100 provided by the embodiments of the present disclosure can adapt different speech recognition service providers; furthermore, after incorporating the speech recognition capability into the speech recognition module 30, the processor 10 only needs to transmit the audio clips that need to be recognized to the speech recognition module 30, and the speech recognition module 30 can return the recognition data required by the processor 10, which can reduce the complexity of external processing logics.

Referring to FIG. 2 and FIG. 16, the embodiments of the present disclosure provide one or more non-transitory computer-readable storage media 300 storing computer-executable instructions 302 thereon. When being executed by one or more processors 10, the computer-executable instructions 302 cause the processor 10 to execute the matching method of any of the above-mentioned embodiments.

For example, when being executed by the one or more processors 10, the computer-executable instructions 302 cause the processor 10 to perform the following operations.

At block 011, one or more audio clips are extracted from an integrated video clip, where the integrated video clip is obtained by integrating multiple original video clips, with repeating parts of the multiple original video clips merged.

At block 012, the audio clips are uploaded to acquire recognition data of the audio clips, where the recognition data includes subtitle data, a start time of the subtitle data and an end time of the subtitle data.

At block 013, the recognition data is matched with the multiple original video clips, to load, into each of the original video clips, a part of the subtitle data that matches a start time and an end time of the original video clip.

For another example, when being executed by the one or more processors 10, the computer-executable instructions 302 cause the processor 10 to further perform the following operations.

At block 0111, the repeating parts in all the original video clips are identified.

At block 0112, any one of identical repeating parts of the original video clips having the identical repeating parts, is determined as a to-be-integrated part. In other words, any one of identical repeating parts of all the original video clips is determined as a to-be-integrated part until the operation of determining the to-be-integrated part is performed for all the repeating parts, to obtain at least one to-be-integrated part.

At block 0113, the integrated video clip is generated according to the to-be-integrated part and other parts, excepting the identical repeating parts, of the original video clips having the identical repeating parts. In other words, the integrated video clip is generated by integrating the at least one to-be-integrated part and other parts of the original video clips excepting the repeating parts.

Although the embodiments of the present disclosure have been shown and described above, it can be understood that the above embodiments are exemplary and should not be construed as limitations on the present disclosure. Those of ordinary skill in the art can make changes, modifications, substitutions and variants on the above embodiments within the scope of the present disclosure. The scope of this disclosure is defined by the claims and their equivalents.

What is claimed is:

1. A matching method, applied to a terminal, the method comprising:
   extracting one or more audio clips from an integrated video clip, wherein the integrated video clip is obtained by integrating a plurality of original video clips, with repeating parts of the plurality of original video clips merged;
   acquiring recognition data of the extracted audio clips, the recognition data comprising subtitle data, a start time of the subtitle data and an end time of the subtitle data; and
   matching the subtitle data to the integrated video clip based on the start time and the start time of the recognition data, to obtain a recommended video;
   wherein the matching the subtitle data to the integrated video clip based on the start time and the start time of the recognition data, to obtain a recommended video, comprises:
      matching the recognition data with the plurality of original video clips, to load, into each of the original video clips, a part of the subtitle data that matches a start time and an end time of the original video clip; and
      generating the recommended video according to the plurality of original video clips into which the subtitle data has been loaded.

2. The matching method as claimed in claim 1, wherein before the extracting one or more audio clips from an integrated video clip, the method further comprises:
   identifying the repeating parts in all the original video clips;
   determining any one of identical repeating parts of all the original video clips as a to-be-integrated part until the operation of determining the to-be-integrated part is performed for all the repeating parts, to obtain at least one to-be-integrated part; and
   generating the integrated video clip, by integrating the at least one to-be-integrated part and other parts of the original video clips excepting the repeating parts.

3. The matching method as claimed in claim 2, wherein the extracting one or more audio clips from an integrated video clip comprises:
   extracting an initial audio clip from the integrated video clip; and
   cutting the initial audio clip according to a limited duration, to generate the audio clips of the integrated video clip.

4. The matching method as claimed in claim 3, wherein the cutting the initial audio clip according to a limited duration to generate the audio clips of the integrated video clip, comprises:
   identifying a point of silence in the initial audio clip; and
   cutting the initial audio clip according to the point of silence and the limited duration, to generate the audio clips of the integrated video clip.

5. The matching method as claimed in claim 1, wherein the acquiring recognition data of the audio clips comprises:
   invoking a file upload interface to upload the audio clips to a cloud server;
   receiving the recognition data returned from the cloud server, the recognition data being obtained by processing at the cloud server; and
   saving the recognition data in a temporary queue.

6. The matching method as claimed in claim 2, wherein the identifying the repeating parts in all the original video clips comprises:
   acquiring source paths of all the original video clips, and acquiring the start time and the end time of each of the original video clips in a respective source video; and
   determining the repeating parts, according to the source paths, the start times, and the end times of the original video clips.

7. The matching method as claimed in claim 1, wherein the matching method further comprises:
   determining a time interval between two of the original video clips, according to source paths, the start times, and the end times of the original video clips; and
   integrating the two original video clips into one original video clip, upon determining that the time interval between the two original video clips is less than a predetermined value.

8. The matching method as claimed in claim 3, wherein the matching method further comprises:
   converting a format of the initial audio clip into a restricted format.

9. The matching method as claimed in claim 4, wherein the identifying a point of silence in the initial audio clip comprises:
   determining, as the point of silence, an initial point of a preset period of time during which an intensity of an audio signal of the initial audio clip is less than a predetermined intensity value.

10. The matching method as claimed in claim 6, wherein the determining the repeating parts according to the source paths, the start times, and the end times of the original video clips, comprises:
    acquiring durations of two of the original video clips based on the start times and the end times of the two original video clips, upon determining that the source paths of the two original video clips are the same; and
    determining overlapping parts of the two original video clips as the repeating parts, upon determining, based on the acquired durations of the two original video clips, that the two original video clips overlap.

11. A terminal, comprising a processor, wherein the processor is configured to:
    extract one or more audio clips from an integrated video clip, wherein the integrated video clip is obtained by integrating a plurality of original video clips, with repeating parts of the plurality of original video clips merged;

acquire recognition data of the audio clips, the recognition data comprising subtitle data, a start time of the subtitle data and an end time of the subtitle data; and match the subtitle data to the integrated video clip based on the start time and the start time of the recognition data, to obtain a recommended video, comprising:

matching the recognition data with the plurality of original video clips, to load, into each of the original video clips, a part of the subtitle data that matches a start time and an end time of the original video clip; and generating the recommended video according to the plurality of original video clips into which the subtitle data has been loaded.

12. The terminal as claimed in claim 11, wherein the processor is further configured to:

identify the repeating parts in all the original video clips;

determine any one of identical repeating parts of all the original video clips as a to-be-integrated part until the operation of determining the to-be-integrated part is performed for all the repeating parts, to obtain at least one to-be-integrated part; and generate the integrated video clip, by integrating the at least one to-be-integrated part and other parts of the original video clips excepting the repeating parts.

13. The terminal as claimed in claim 12, wherein the processor is further configured to:

extract an initial audio clip from the integrated video clip;

identify a point of silence in the initial audio clip; and cut the initial audio clip according to the point of silence and a limited duration, to generate the audio clips of the integrated video clip.

14. The terminal as claimed in claim 11, wherein the terminal further comprises a memory, and the processor is further configured to:

invoke a file upload interface to upload the audio clips to a cloud server;

receive the recognition data returned from the cloud server, the recognition data being obtained by processing at the cloud server; and save the recognition data in a temporary queue of the memory.

15. The terminal as claimed in claim 12, wherein the processor is further configured to:

acquire source paths of all the original video clips, and acquire the start time and the end time of each of the original video clips in a respective source video; and determine the repeating parts, according to the source paths, the start times, and the end times of the original video clips.

16. The terminal as claimed in claim 11, wherein the processor is further configured to:

determine a time interval between two of the original video clips, according to source paths, the start times, and the end times of the original video clips; and integrate the two original video clips into one original video clip, upon determining that the time interval between the two original video clips is less than a predetermined value.

17. A non-transitory computer-readable storage medium storing computer-executable instructions thereon, wherein when being executed by one or more processors, the computer-executable instructions cause the one or more processors to execute a matching method comprising:

extracting one or more audio clips from an integrated video clip, wherein the integrated video clip is obtained by integrating a plurality of original video clips, with repeating parts of the plurality of original video clips merged;

acquiring recognition data of the audio clips, the recognition data comprising subtitle data, a start time of the subtitle data and an end time of the subtitle data; and matching the subtitle data to the integrated video clip based on the start time and the start time of the recognition data, to obtain a recommended video;

wherein the matching the subtitle data to the integrated video clip based on the start time and the start time of the recognition data, to obtain a recommended video, comprises:

matching the recognition data with the plurality of original video clips, to load, into each of the original video clips, a part of the subtitle data that matches a start time and an end time of the original video clip; and generating the recommended video according to the plurality of original video clips into which the subtitle data has been loaded.

18. The computer-readable storage medium as claimed in claim 17, wherein the acquiring recognition data of the audio clips comprises:

invoking a file upload interface to upload the audio clips to a cloud server;

receiving the recognition data returned from the cloud server, the recognition data being obtained by processing at the cloud server; and saving the recognition data in a temporary queue.

19. The computer-readable storage medium as claimed in claim 17, wherein the extracting one or more audio clips from an integrated video clip comprises:

extracting an initial audio clip from the integrated video clip;

identifying a point of silence in the initial audio clip; and cutting the initial audio clip according to the point of silence and a limited duration, to generate the audio clips of the integrated video clip.

20. The computer-readable storage medium as claimed in claim 17, wherein before the extracting one or more audio clips from an integrated video clip, the method further comprises:

identifying the repeating parts in all the original video clips;

determining any one of identical repeating parts of all the original video clips as a to-be-integrated part until the operation of determining the to-be-integrated part is performed for all the repeating parts, to obtain at least one to-be-integrated part; and generating the integrated video clip, by integrating the at least one to-be-integrated part and other parts of the original video clips excepting the repeating parts;

wherein the identifying the repeating parts in all the original video clips comprises:

acquiring source paths of all the original video clips, and acquiring a start time and an end time of each of the original video clips in a respective source video;

acquiring durations of two of the original video clips based on the start times and the end times of the two original video clips, upon determining that the source paths of the two original video clips are the same; and determining overlapping parts of the two original video clips as the repeating parts, upon determining, based on the acquired durations of the two original video clips, that the two original video clips overlap.

* * * * *